US008107664B2

(12) United States Patent
Mao

(10) Patent No.: US 8,107,664 B2
(45) Date of Patent: Jan. 31, 2012

(54) CAP WITH BLUETOOTH HEADSET

(76) Inventor: Yongzhong Mao, Yangzhou (CN)

( * ) Notice: Subject to any disclaimer, the term of this patent is extended or adjusted under 35 U.S.C. 154(b) by 1029 days.

(21) Appl. No.: 12/026,481

(22) Filed: Feb. 5, 2008

(65) Prior Publication Data

US 2008/0192974 A1 Aug. 14, 2008

(30) Foreign Application Priority Data

Feb. 9, 2007 (CN) ...................... 2007 2 0034609 U

(51) Int. Cl.
*H04R 25/00* (2006.01)
*H04R 9/06* (2006.01)
*H04R 1/02* (2006.01)
*H04L 12/58* (2006.01)
*H04B 1/38* (2006.01)
*A42B 1/06* (2006.01)

(52) U.S. Cl. ........ 381/376; 381/336; 381/377; 381/370; 381/378; 381/388; 455/412; 455/90.2; 455/90.1; 455/90.3; 2/209; 2/900; 2/906

(58) Field of Classification Search .................. 381/376, 381/336, 377, 378, 388, 370; 455/412, 90; 2/209.13, 423, 900, 209, 906
See application file for complete search history.

(56) References Cited

U.S. PATENT DOCUMENTS 3,197,785 A * 8/1965 Simpson et al. .................. 2/423
4,858,248 A * 8/1989 Goldsmith et al. .......... 2/209.13
5,410,746 A * 4/1995 Gelber .......................... 455/344
6,115,846 A * 9/2000 Truesdale .................... 2/209.13
7,283,641 B2 * 10/2007 Rolla ............................ 381/376
2002/0131616 A1 * 9/2002 Bronnikov et al. ........... 381/370
2006/0185062 A1 * 8/2006 Peng et al. ................... 2/209.13
2006/0251283 A1 * 11/2006 Yeh .............................. 381/388
2007/0171628 A1 * 7/2007 Seade ........................... 362/106
2007/0258614 A1 * 11/2007 Langberg ...................... 381/379
2008/0181429 A1 * 7/2008 Fried ............................... 381/87

* cited by examiner

*Primary Examiner* — Anh Mai
*Assistant Examiner* — Mangtin Lian
(74) *Attorney, Agent, or Firm* — Global IP Services; Tianhua Gu

(57) ABSTRACT

The invention discloses a cap with a bluetooth headset which is in the technology field of daily supplies, including a cap body. The cap body has a bluetooth headset which comprises a transceiver and two acoustic generators on the right and left respectively, the transceiver is set at either position of the cap body, each of the acoustic generators are respectively set at a side of the cap body corresponding to the ears. A piece of lead is used to connect the transceiver and acoustic generators. Compared with prior art, the invention provides dual-track voice, so as to make communication clearer, reduce noise influence on environment. The acoustic generators are fixed on both sides of the cap body so firmly that it is not prone to be dropped and lost, even under movement states, it is still very firm. The invention is applicable to outside activities, travel, riding etc.

2 Claims, 2 Drawing Sheets

CAP WITH BLUETOOTH HEADSET

CROSS REFERENCE TO RELATED PATENT APPLICATION

This application claims the priority of the Chinese patent application No. 200720034609.6 with filing date of Feb. 9, 2007.

FIELD OF THE INVENTION

The invention relates to daily supplies, particularly a cap.

BACKGROUND OF THE INVENTION

In prior art, there exists a bluetooth headset, which is used together with a mobile phone and is mainly composed of a transceiver and an acoustic generator which are connected by a piece of lead. The transceiver and the acoustic generator are firmly connected and can be integrally made. The transceiver has a hook that can be hung on ears; while being used, the hook is hung on ears and the acoustic generator is only in earholes. The transceiver is used for receiving and transmitting information and can convert the received information into audio signals and then transmit them to the acoustic generator through lead to generate sound; since the bluetooth headset is just hung on ears while being used, it can't be firmly fixed, it may easily fall, particularly under movement states, such as walking, riding and head turning, the headset will be dropped more easily and it will be lost; after it has been used for long time, the ears will be in pain; moreover, the existing bluetooth headset is designed to have only a single track, so the sound is not clear while in use and easy to be disturbed by external noises.

In prior art, there exists another kind of cap, which mainly includes a cap body and in particular has the function of retaining and keeping out sunshine, but it also has a shortcoming, that is, it has a relatively single use function.

SUMMARY OF THE INVENTION

The invention aims at providing a cap with a bluetooth headset to combine the cap's use function so that it can perfectly integrates the bluetooth headset and the cap with the bluetooth headset fixed firmly to eliminate the worry of dropping.

The invention realizes the object in this way: a cap with bluetooth headset, including a cap body; the said cap body has a bluetooth headset which comprises a transceiver and two acoustic generators on the right and left respectively, wherein the transceiver is set at either position of the cap body, the acoustic generators are set at either side of the cap body corresponding to the ears, a piece of lead is used to connect the transceiver and acoustic generators.

Compared with prior art, the invention provides dual-track voice, so as to make communication clearer, reduce noise influence on environment. The acoustic generators are fixed on both sides of the cap body so firmly that it is not prone to be dropped and lost, even under movement states, it is still very firm. The invention is applicable to outside activities, travel, riding etc.

For easy connection and take-down, the said transceiver is fixed on one side of the cap body, the acoustic generator corresponding to this side is fixed on the transceiver by a connecting arm, and a plug and a socket are set on the lead connecting the transceiver and the acoustic generator on the other side.

In order to increase standby time of the bluetooth headset, a cell panel which supplies power to the transceiver is set on the cap body 1, the acoustic generator on the other side and the cell panel is fixed together by a connecting arm.

For easy cleaning of cap body, a connecting plate is set on the position inside the said cap body corresponding to the acoustic generators and the cell panel respectively, and the connecting plate and the transceiver and cell panel are connected by a bolt through the cap body. Also a plug-in bayonet catch can be set on each side of the cap body and a fixing block adapted for to the plug-in bayonets is set on the transceiver and cell panel respectively, wherein the fixing blocks are inserted into the plug-in bayonets. In the two technical solutions above, the cap body can be cleaned after taking down the transceiver, acoustic generators and cell panel.

Wherein, 1 is a cap body, 2 is an acoustic generator, 3 is a connecting arm, 4 is a transceiver, 5 is a cell panel, 6 is a connecting plate, 7 is a connecting bolt, 8 is a plug and a socket and 9 is a piece of lead.

DETAIL DESCRIPTION OF THE INVENTION

Figure 1:
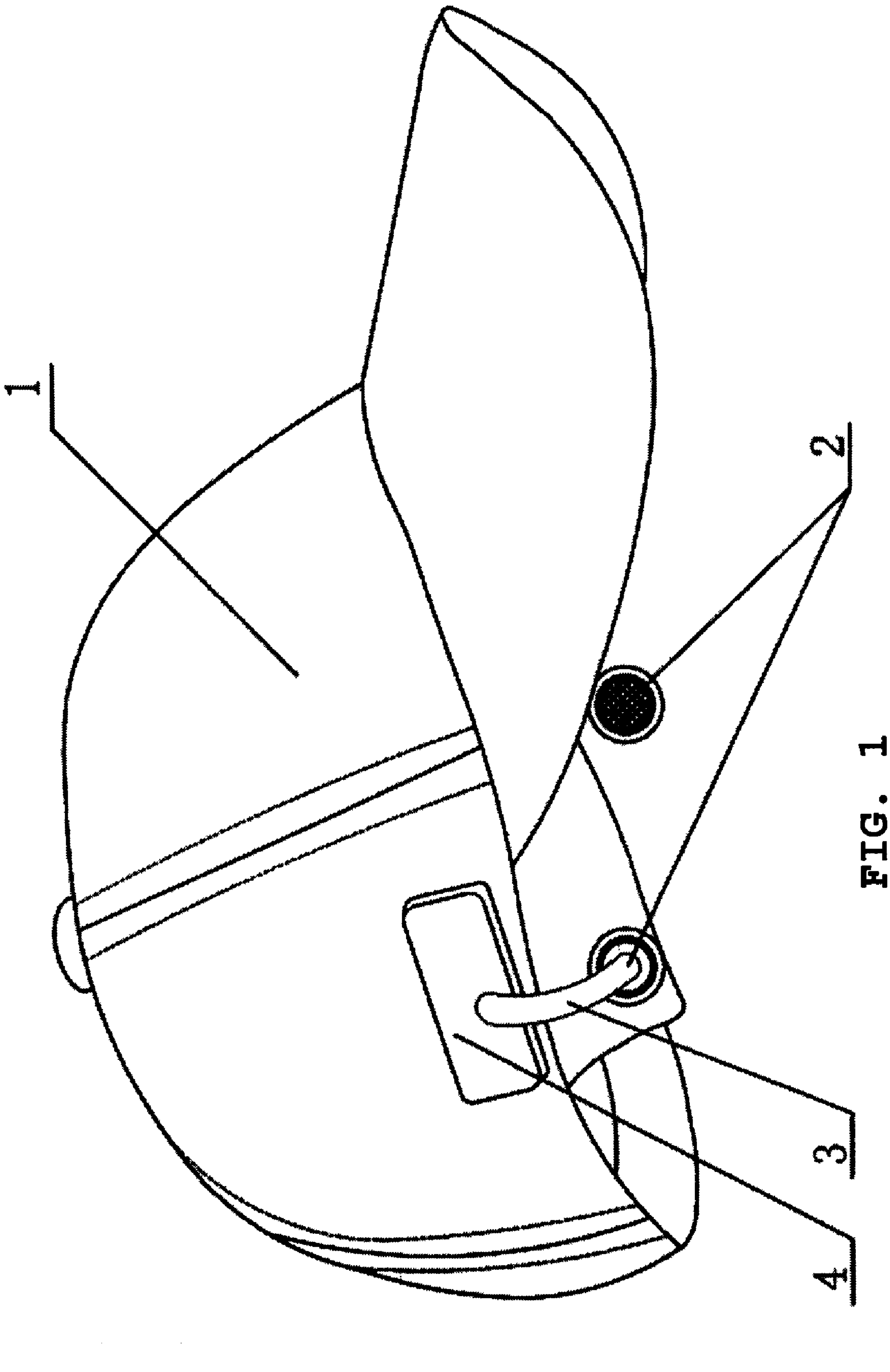
FIG. 1 is the structural schematic view of the invention.
Figure 2:
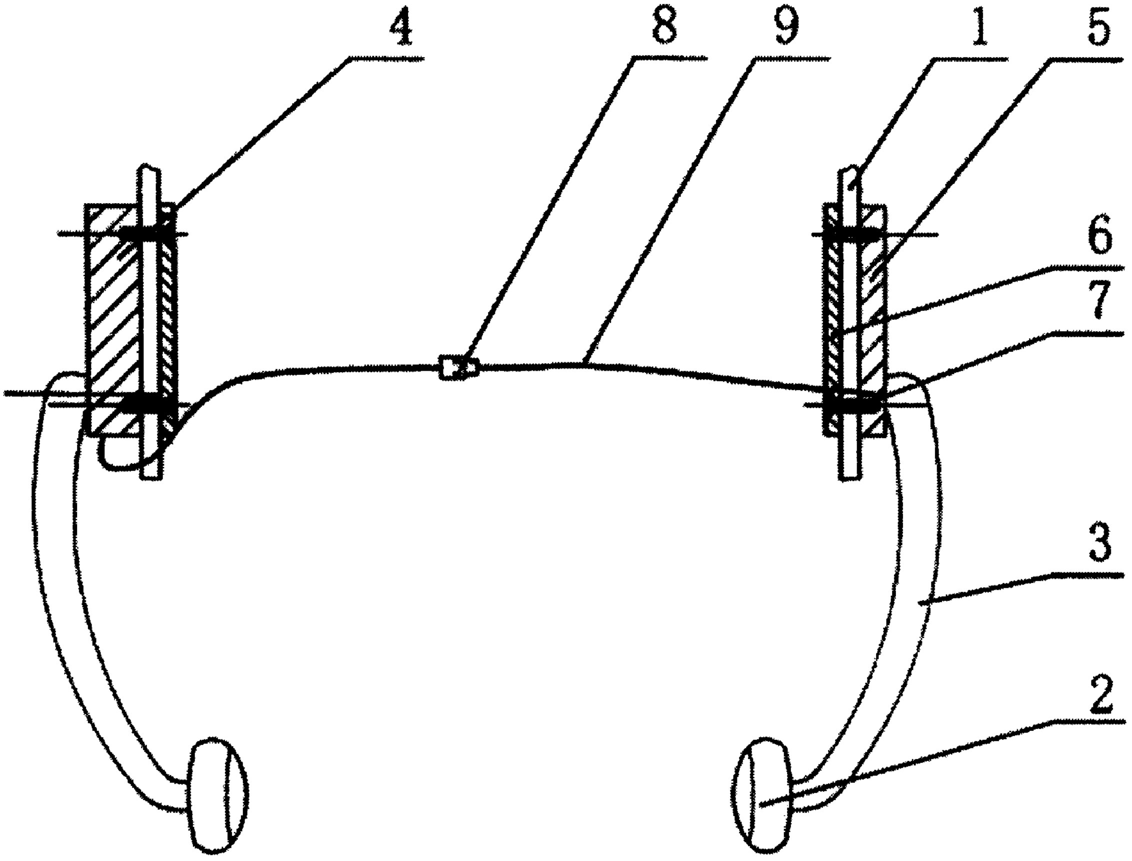
FIG. 2 is the partial structural schematic view of the invention.

As shown in FIGS. 1 and 2 is a cap with a bluetooth headset, including a cap body 1, the said cap body 1 having a bluetooth headset which comprises a transceiver 4 and two acoustic generators 2 on the right and left respectively, wherein the transceiver 4 is set at either position of the cap body 1, the acoustic generators 2 are set at either side of the cap body 1 corresponding to the ears, a piece of lead is used to connect the transceiver 4 and acoustic generators 2; but for easy connection and take-down, the said transceiver 4 can be fixed on one side of the cap body 1, the acoustic generator 2 corresponding to this side is fixed on the transceiver 4 by a connecting arm 3, and a plug and a socket 8 is set on the lead 9 connecting the transceiver 4 and the acoustic generator 2 on the other side.

In order to increase standby time of the bluetooth headset, a cell panel 5 which supplies power to the transceiver 4 is set on the said cap body 1, the acoustic generator 2 on the other side and the cell panel 5 are fixed together by a connecting arm 3, wherein the arm 3 can be made in any folding forms to enable the position of the acoustic generators 2 to be adjustable and further extend into earholes after folding at discretion, suitable for any population group.

For easy cleaning of cap body, a connecting plate 6 is set on the position inside the said cap body 1 corresponding to the acoustic generators 2 and the cell panel 5 respectively, and the connecting plate 6 and the transceiver 4 and cell panel 5 are connected by a bolt 7 through the cap body 1. The cap body 1 can be cleaned after taking down the transceiver 4, acoustic generators 2 and cell panel 5.

The invention is not limited to the above embodiment. There are also other connecting methods between the transceiver 4 and cell panel 5 and the cap body 1, for instance, a plug-in bayonet catch is set on either side of the cap body 1 and a fixing block adapted for the plug-in bayonets is set on the transceiver 4 and cell panel 5 respectively, wherein the fixing blocks are inserted into the plug-in bayonets. In the technical solution, the cap body 1 can be cleaned after taking down the transceiver 4, acoustic generators 2 and cell panel 5.

The invention provides dual-track voice, so as to make communication clearer, reduce noise influence on environment. The acoustic generators 2 are fixed on both sides of the cap body 1 so firmly that it is not prone to be dropped and lost, even under movement states, it is still very firm. The invention is applicable to outside activities, travel, riding etc.

What is claimed is:

1. A cap with a bluetooth headset comprising:

a cap body;

a bluetooth headset including a transceiver and two acoustic generators;

the transceiver is fixed on one outside of the cap body corresponding to first ear by a bolt-connection with a first connecting plate set on same position inside of the cap body through the cap body, a first acoustic generator is fixed on the transceiver by a connecting arm;

a cell panel for supplying power to the transceiver is fixed on other outside of the cap body corresponding to second ear by a bolt-connection with a second connecting plate set on same position inside of the cap body through the cap body, a second acoustic generator is connected with the cell panel by a connecting arm; and the first and second acoustic generator are electronically connected with the transceiver by a piece of lead.

2. The cap with a bluetooth headset as claimed in claim 1, wherein a plug and a socket are set on the lead connecting the transceiver and second acoustic generator.

* * * * *